United States Patent [19]

Shahriary et al.

[11] Patent Number: 4,897,809
[45] Date of Patent: Jan. 30, 1990

[54] HIGH SPEED ADDER

[75] Inventors: Iradj Shahriary, Santa Monica; George S. Des Brisay, Jr., Hemet; Susan K. Avery, Altadena, all of

[73] Assignee: Hughes Aircraft Company, Los Angeles, Calif.

[21] Appl. No.: 95,969

[22] Filed: Sep. 14, 1987

[51] Int. Cl.$^4$ .............................................. G06F 7/50
[52] U.S. Cl. ...................................................... 364/784
[58] Field of Search ................................. 364/784–788

[56] References Cited

U.S. PATENT DOCUMENTS

| | | | |
|---|---|---|---|
| 4,464,728 | 8/1984 | Nash | 364/786 |
| 4,623,982 | 11/1986 | Ware | 364/788 |
| 4,733,365 | 3/1988 | Nagamatsu | 364/784 |
| 4,761,760 | 8/1988 | Tomoji | 364/788 |

Primary Examiner—Gary V. Harkcom
Assistant Examiner—Long T. Nguyen
Attorney, Agent, or Firm—Steven M. Mitchell; Wanda K. Denson-Low

[57] ABSTRACT

An improved cascadable adder (11) which, through the use of merged logic, provides high speed operation in the presence of input loading and internal fan-out limitations. The invention may be implemented in gallium arsenide technology and includes a first circuit (13) for exclusive ORing first bits ($A_1$, $B_1$) of first and second digital words (A, B) respectively; and a second circuit (37) operatively connected to the first circuit (13) for generating, with only two gate delays, a carry ($C_1$) associated with the summing of the first bits.

1 Claim, 2 Drawing Sheets

HIGH SPEED ADDER

BACKGROUND OF THE INVENTION

1. Field of the Invention

The present invention relates to adder circuits. More specifically, the present invention relates to adders implemented with gallium arsenide technology.

While the present invention is described herein with reference to an illustrative embodiment for a particular application, it is understood that the invention is not limited thereto. Those of ordinary skill in the art and access to the teachings provided herein will recognize additional modifications, applications and embodiments within the scope thereof.

2. Description of the Related Art

High speed adders are at the heart of many digital systems. For example, high speed adders are used with holding registers to provide accumulators used in direct digital synthesizers. Direct digital synthesizers provide fine resolution in frequency step size for frequency synthesizers. Since the maximum frequency out of a direct digital synthesizer must be less than half its clock frequency the bandwidth and resolution of frequency synthesizers is limited by the adder/clock. Thus, there is a general need in the art to increase the speed of such adders.

Previous emitter coupled logic (ECL) and transistor transistor logic (TTL) fast adder designs utilized adders and carry look ahead logic which made extensive use of large fan-in merged logic gates. (See Fairchild's F100180 six-bit fast adder, for example.) It is generally known in the art that for some applications, gallium arsenide GaAs technology offers the potential for higher speed and lower power consumption relative to ECL and TTL technologies.

Unfortunately, merged logic gates with a high fanin become impractical in very high speed FET GaAs logic. This is due to the fact that the parasitic capacitive loading effects of the multiple inputs become more predominant, vis-a-vis gate speed as the speed and fan-in increases. That is, at high speed with high fan-in, these effects constitute a larger fraction of the gate propagation delays.

The operating speed of each adder is also limited by finite gate delays. It follows that the number of gates required to generate the sum and carry outputs impacts directly on the operating speed of the adder. In most adders, as the size of the adder increases, the number of cascaded stages increases accordingly. Thus, in cascaded adders, the number of gate delays required to generate the carry in each adder is of particular importance.

There is therefore a need in the art for a cascadable fast adder configuration which may be implemented in gallium arsenide technology.

SUMMARY OF THE INVENTION

The need in the art for a cascadable fast adder configuration which may be implemented in gallium arsenide is addressed by the high speed adder of the present invention. The invention includes a first circuit for exclusive Oring first bits of first and second digital words respectively; and a second circuit operatively connected to the first circuit for generating, with only two gate delays, a carry associated with the summing of the first bits.

In a specific embodiment, a high speed two bit adder is provided which includes the first circuit for exclusive ORing first bits of first and second digital words respectively; the second circuit operatively connected to the first circuit for generating, with only two gate delays, a carry associated with the summing of the first bits; a third circuit for exclusive ORing second bits of first and second digital words respectively; and a fourth circuit, operatively connected to said first, second and third circuits for generating, with only two gate delays, an output carry associated with the addition of said first and second digital words.

In a further more specific embodiment, the invention includes a fifth circuit for exclusive ORing the exclusive OR of the first bits with an input carry to generate a first output sum; and a sixth circuit for exclusive ORing the exclusive OR of the second bits with the internal carry to generate a second output sum.

The advantageous design of the present invention is made possible by the use of merged logic gates.

DESCRIPTION OF THE INVENTION

Figure 1:
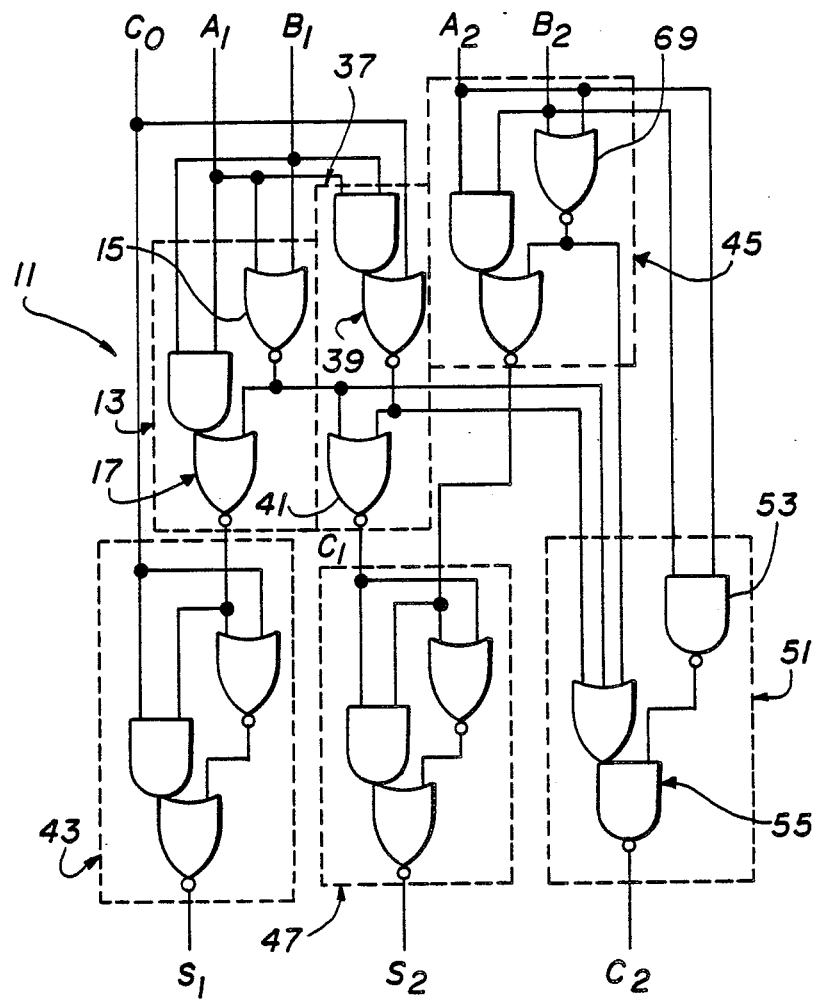
FIG. 1 shows a logic diagram of a two bit adder configured in accordance with the teachings of the present invention.

As described below and illustrated in the drawings, the advantageous configuration of the present invention provides a fast two bit adder with an output carry generated with only two gate delays and sums generated with only four gate delays. These features permit the adder of the present invention to be cascaded to provide larger high speed adders.

FIG. 1 shows a logic diagram of a two bit adder configured in accordance with the teachings of the present invention. The two bit adder 11 includes a first exclusive OR gate 13 into which the first bits $A_1$ and $B_1$ of first and second digital words A and B, respectively, are input. The exclusive OR gate 13 is implemented with a NOR gate 15 and an AND-NOR merged gate 17.

Figure 2:
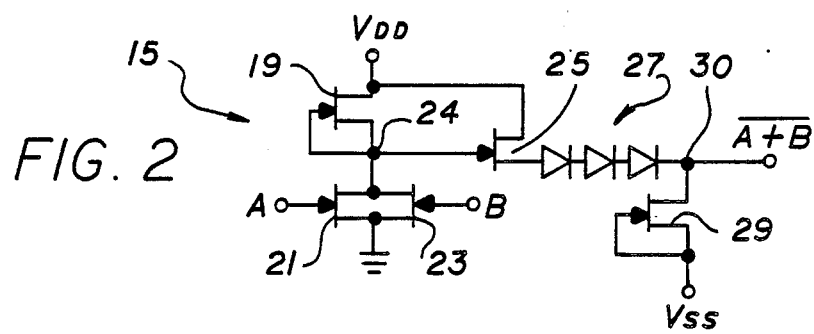
FIG. 2 is an illustrative schematic representation of a NOR gate implemented in depletion mode gallium arsenide FET logic and utilized in the present invention.

An illustrative GaAs FET implementation of NOR gates utilized in the present invention is provided in FIG. 2. It includes a constant current load transistor 19, which is connected to the drains of first and second parallel transistors 21 and 23. (All transistors are FET unless otherwise specified.) The first and second transistors 21 and 23 provide A and B inputs for the NOR gate 15. It will be apparent that when the first or second transistor 21 or 23 is activated, the voltage drop across each, and therefore the output at node 24 goes low. Similarly, when neither transistor 21 or 23 is activated, the output at node 24 goes high. This turns on a buffer transistor (configured as a source follower) 25 and current flows through offset diodes 27. A fifth transistor 29 provides a current source to act as a load for the source follower 25 and offset diodes 27. The signal at the output node 30 represents $(A + B)'$, where the "'" denotes the complement of a value. The buffer transistor 25, offset diodes 27 and current source 29 provide output circuitry which, along with the load transistor 19, will be seen to be common to the illustrative schematic implementations discussed below.

Figure 3:
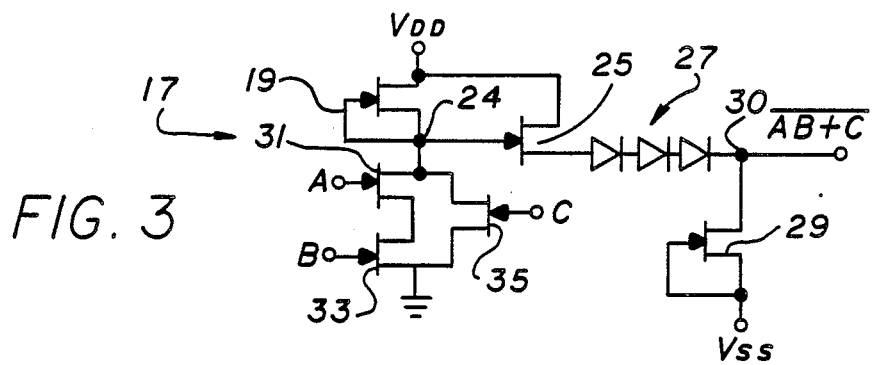
FIG. 3 is an illustrative schematic representation of a merged AND-NOR gate implemented in depletion mode gallium arsenide FET logic and utilized in the present invention.

Returning briefly to FIG. 1, the exclusive OR gate 13 also includes a merged AND-NOR gate 17. The $A_1$ and $B_1$ inputs are routed into the AND inputs and NORed with the output of the NOR gate 15. An illustrative schematic implementation of the merged AND-NOR gates utilized in the present invention is shown in FIG. 3. It includes the same load and output design of the NOR gate 15 of FIG. 2. It differs in its logic circuitry which includes series connected transistors 31 and 33, which provide A and B inputs, across which a third transistor 35 is connected. It will be apparent to those skilled in the art that the A and B transistors 31 and 33 provide an AND gate while the C input transistor 35, together with the AND gate output, provides a NOR gate. The output signal at node 30 of the merged AND-NOR gate 17 represents $(AB + C)'$.

Returning again to FIG. 1, the two bit fast adder 11 of the present invention includes first carry generating logic 37 which generates the internal carry associated with the addition of the first bits $A_1$ and $B_1$, and the input carry $C_0$. Once again, the input bits $A_1$ and $B_1$ are provided to the AND inputs of a second merged AND-NOR gate 39. The output of the AND gate portion of the merged gate is NORed with the input carry $C_0$. The output of the first NOR gate 15 is NORed with the output of the merged gate 39 by a second NOR gate 41 to provide an internal carry $C_1$. The merged gate 39 and the NOR gate 41 thus provide the first carry generating logic 37.

Figure 4:
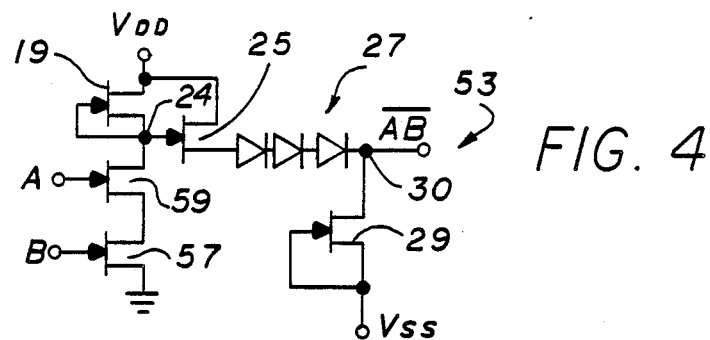
FIG. 4 is an illustrative schematic representation of a NAND gate implemented in depletion mode gallium arsenide FET logic and utilized in the present invention.
Figure 5:
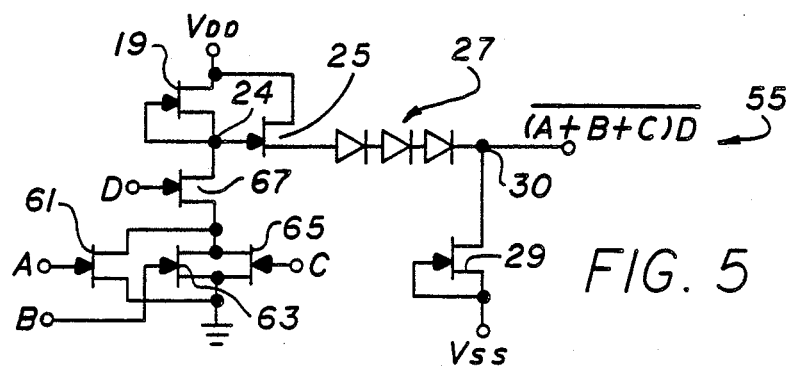
FIG. 5 is an illustrative schematic implementation of an OR-NAND merged gate implemented in depletion mode gallium arsenide FET logic and utilized in the present invention.

The exclusive OR of the input bits $A_1$ and $B_1$ is exclusive ORed with the input carry $C_0$ by a second exclusive OR gate 43 to provide a first sum $S_1$. The second exclusive OR gate 43 is identical to the first exclusive OR gate 13 and provides first sum generating logic. The exclusive OR gates 13 and 43, and the first carry generating logic 37 provide a complete one bit adder. A second adder is provided by the provision of third and fourth exclusive OR gates 45 and 47 having the same configuration as the first and second exclusive OR gates 13 and 43 respectively. The third exclusive OR gate 45 provides the exclusive OR of second bits $A_2$ and $B_2$ as one of two inputs to the fourth exclusive OR gate 47. The second input to the fourth exclusive OR gate 47 is the internal carry $C_1$ provided by the first carry generating logic 37. The two bit adder 11 is completed with the output carry generating logic 51. It includes a NAND gate 53 and an OR-NAND merged gate 55. An illustrative schematic NAND gate 53 is shown in FIG. 4 and an illustrative schematic OR-NAND merged gate is shown in FIG. 5. Each includes the common load and output circuitry discussed above. The NAND gate operation of transistors 57 and 59 of FIG. 4, will be apparent to one skilled in the art. The signal at the output node 30 of the NAND gate 53 represents $(AB)'$.

In FIG. 5, three transistors 61, 63 and 65 provide the A, B, and C inputs of a three input OR gate. This OR gate is NANDed with a D input provided by fourth transistor 67. It follows that the signal at the output node 30 of the merged OR-NAND gate 55 represents $((A+B+C)D)'$. In FIG. 1, the A, B, and C inputs are provided by the first merged gate 39, the first NOR gate 15, of exclusive OR gate 13 and the NOR gate 69 of the exclusive OR gate 45 respectively. The D input is provided by the output of the NAND gate 53. The logic gate 51 thus provides an output carry $C_2$.

For the purpose of illustrating the operation of the adder 11 configured in accordance with the teachings of the present invention, truth tables for one and two-bit adders are shown in Tables 1 and 2 below respectively.

TABLE 1

| $C_0$ | $A_1$ | $B_1$ | $S_1$ | $C_1$ |
|---|---|---|---|---|
| 0 | 0 | 0 | 0 | 0 |
| 1 | 0 | 0 | 1 | 0 |
| 0 | 1 | 0 | 1 | 0 |
| 1 | 1 | 0 | 0 | 1 |
| 0 | 0 | 1 | 1 | 0 |
| 1 | 0 | 1 | 0 | 1 |
| 0 | 1 | 1 | 0 | 1 |
| 1 | 1 | 1 | 1 | 1 |

TABLE 2

| $C_0$ | $A_1$ | $B_1$ | $A_2$ | $B_2$ | $S_1$ | $S_2$ | $C_2$ |
|---|---|---|---|---|---|---|---|
| 0 | 0 | 0 | 0 | 0 | 0 | 0 | 0 |
| 1 | 0 | 0 | 0 | 0 | 1 | 0 | 0 |
| 0 | 1 | 0 | 0 | 0 | 1 | 0 | 0 |
| 1 | 1 | 0 | 0 | 0 | 0 | 1 | 0 |
| 0 | 0 | 1 | 0 | 0 | 1 | 0 | 0 |
| 1 | 0 | 1 | 0 | 0 | 0 | 1 | 0 |
| 0 | 1 | 1 | 0 | 0 | 0 | 1 | 0 |
| 1 | 1 | 1 | 0 | 0 | 1 | 1 | 0 |
| 0 | 0 | 0 | 1 | 0 | 0 | 1 | 0 |
| 1 | 0 | 0 | 1 | 0 | 1 | 1 | 0 |
| 0 | 1 | 0 | 1 | 0 | 1 | 1 | 0 |
| 1 | 1 | 0 | 1 | 0 | 0 | 0 | 1 |
| 0 | 0 | 1 | 1 | 0 | 1 | 1 | 0 |
| 1 | 0 | 1 | 1 | 0 | 0 | 0 | 1 |
| 0 | 1 | 1 | 1 | 0 | 0 | 0 | 1 |
| 1 | 1 | 1 | 1 | 0 | 1 | 0 | 1 |
| 0 | 0 | 0 | 0 | 1 | 0 | 1 | 0 |
| 1 | 0 | 0 | 0 | 1 | 1 | 1 | 0 |
| 0 | 1 | 0 | 0 | 1 | 1 | 1 | 0 |
| 1 | 1 | 0 | 0 | 1 | 0 | 0 | 1 |
| 0 | 0 | 1 | 0 | 1 | 1 | 1 | 0 |
| 1 | 0 | 1 | 0 | 1 | 0 | 0 | 1 |
| 0 | 1 | 1 | 0 | 1 | 0 | 0 | 1 |
| 1 | 1 | 1 | 0 | 1 | 1 | 0 | 1 |
| 0 | 0 | 0 | 1 | 1 | 0 | 0 | 1 |
| 1 | 0 | 0 | 1 | 1 | 1 | 0 | 1 |
| 0 | 1 | 0 | 1 | 1 | 1 | 0 | 1 |
| 1 | 1 | 0 | 1 | 1 | 0 | 1 | 1 |
| 0 | 0 | 1 | 1 | 1 | 1 | 0 | 1 |
| 1 | 0 | 1 | 1 | 1 | 0 | 1 | 1 |
| 0 | 1 | 1 | 1 | 1 | 0 | 1 | 1 |
| 1 | 1 | 1 | 1 | 1 | 1 | 1 | 1 |

From Table 1, the sum term $S_1$ of the one bit adder can be seen to be:

$$S_1 = C_0 A_1' B_1' + C_0' A_1 B_1' + C_0' A_1' B_1 + C_0 A_1 B_1 \qquad [1]$$

This function can be generated by two exclusive OR gates:

$$(A_1 \oplus B_1) \oplus C_0 = (A_1 B_1' + A_1' B_1) C_0' + (A_1 B_1' + A_1' B_1)' C_0 \qquad [2]$$

by DeMorgan's theorem:

$$= (A_1 B_1' + A_1' B_1) C_0' + (A_1' + B_1)(A_1 + B_1') C_0 \qquad [3]$$

by Distribution:

$$A_1B_1'C_0' + A_1'B_1C_0' + A_1'B_1C_0 + A_1B_1C_0 \quad Q.E.D.$$

Now, for the generation of the internal and output carrys $C_1$ and $C_2$. The internal carry $C_1$ is generated in the first stage and can be seen from Table 1 to be:

$$C_1 = A_1C_0 + B_1C_0 + A_1B_1 + A_1B_1C_0 \quad [4]$$

simplifying yields:

$$C_1 = A_1C_0 + B_1C_0 + A_1B_1 \quad [5]$$

From FIG. 1, it is apparent that $C_1$ is equal to the above expression:

$$C_1 = ((A_1 + B_1)' + (C_0 + A_1B_1)')' \quad [6]$$

by DeMorgan's theorem:

$$C_1 = (A_1 + B_1)(C_0 + A_1B_1) \quad [7]$$

by the law of Distribution and simplifying:

$$C_1 = A_1C_0 + B_1C_0 + A_1B_1 \quad [8]$$

Thus, it can be seen that the carry generating logic 37 generates the correct expression for the internal carry $C_1$.

The output carry $C_2$ for a two-bit adder is seen from Table 2 to be formed of a sum of sixteen product terms. The expression can be reduced, however, to a sum of seven product terms:

$$C_2 = A_2B_2 + A_1A_2B_1 + A_1B_1B_2 + A_1A_2C_0 + A_2B_1C_0 + A_1B_2C_0 + B_1B_2C_0 \quad [9]$$

From FIG. 1, the final carry $C_2$ can be seen to be:

$$C_2 = ((A_2B_2)'((A_2+B_2)' + (A_1B_1)' + (A_1B_1+C_0)')')' \quad [10]$$

by DeMorgan's theorem:
$$C_2 = A_2B_2 + (A_2+B_2)(A_1+B_1)(A_1B_1+C_0) \quad [11]$$

by distribution and eliminating redundant terms:

$$C_2 = A_2B_2 + A_1A_2B_1 + A_1B_1B_2 + A_1A_2C_0 + A_2B_1C_0 + A_1B_2C_0 + B_1B_2C_0 \quad Q.E.D.$$

which is the correct expression for the final carry term.

Since the merged gates each have only one gate delay, the final carry is generated with a total of only two gate delays. The short delay allows an adder constructed in accordance with the teachings of the present invention to be readily cascaded with the addition of one gate propagation delay per adder bit. In addition, the two bit adder 11 of the present invention allows the sum terms to be generated with only four gate propagation delays.

Thus, the present invention has been described with reference to a particular embodiment for an illustrative application. Those skilled in the art will recognize additional modifications, applications, and embodiments with the scope thereof. For example, the invention is not limited to implementation in gallium arsenide technology. Further, the mathematical analysis is provided above for the sole purpose of elucidating the operation of the invention. The teachings of the invention should not be mitigated by any review or interpretation of said analysis.

It is intended by the appended claims to cover any and all such modifications, applications, and embodiments within the scope of the invention.

Accordingly,

What is claimed is:

1. A high speed cascadable adder comprising:

first means for providing the exclusive OR of first bits $A_1$ and $B_1$ of first and second digital words A and B, respectively, said first means including:
   a first NOR gate having said first bits $A_1$ and $B_1$ of said first and second digital words A and B, respectively, as inputs and
   a first merged AND/NOR gate having said first bits $A_1$ and $B_1$ of said first and second digital words A and B, respectively, as AND inputs and the output of said first NOR gate as a NOR input;

second means for providing the exclusive OR of the exclusive OR of first bits $A_1$ and $B_1$ of first and second digital words A and B, respectively, and a carry input $C_o$ to provide a first sum output $S_1$; and carry generating logic means for generating, with exactly two gate delays, an output carry $C_1$ corresponding to the sum of said input carry bit $C_o$ and said first bits $A_1$ and $B_1$ of first and second digital words A and B, respectively, said carry generating logic means including:
   a second merged AND/NOR gate having said first bits $A_1$ and $B_1$ of said first and second digital words A and B, respectively, as AND inputs and said input carry bit $C_o$ as a NOR input, and
   a second NOR gate having the output of said second merged AND/NOR gate as a first input and the output of said first NOR gate as a second input, whereby the output of said second NOR gate is said output carry $C_1$.

* * * * *